United States Patent

[11] 3,589,741

| [72] | Inventor | Fernand L. Germain, Jr.<br>Monroe, Conn. |
|---|---|---|
| [21] | Appl. No. | 803,167 |
| [22] | Filed | Feb. 28, 1969 |
| [45] | Patented | June 29, 1971 |
| [73] | Assignee | The Goss and Deleeuw Company<br>Kensington, Conn. |

[54] FLUID-ACTUATED CHUCK
2 Claims, 8 Drawing Figs.

[52] U.S. Cl. .................................................. 279/4,
279/110
[51] Int. Cl. ............................................. B23b 31/16,
B23b 31/30
[50] Field of Search ........................................ 279/4, 117,
110; 269/32, 34

[56] References Cited
UNITED STATES PATENTS
| 1,909,681 | 5/1933 | Jackson ...................... | 269/32 X |
| 2,158,058 | 5/1939 | Godfriaux .................. | 279/4 |

*Primary Examiner*—Andrew R. Juhasz
*Assistant Examiner*—Donald D. Evenson
*Attorney*—Johnson & Kline ABSTRACT: A chuck having a plurality of movable jaws that grasp a workpiece on which an operation is to be performed by the jaws being moved linearly by each having an identical lost-motion connected to a pivotable member that is rotated by linearly movable fluid-actuated pistons. The use of a pivotable member that is common to all jaws and the connections thereto provide a jaw movement that is relatively large to accommodate various sizes of workpieces but yet which is also precise in centering the workpieces on the chuck.

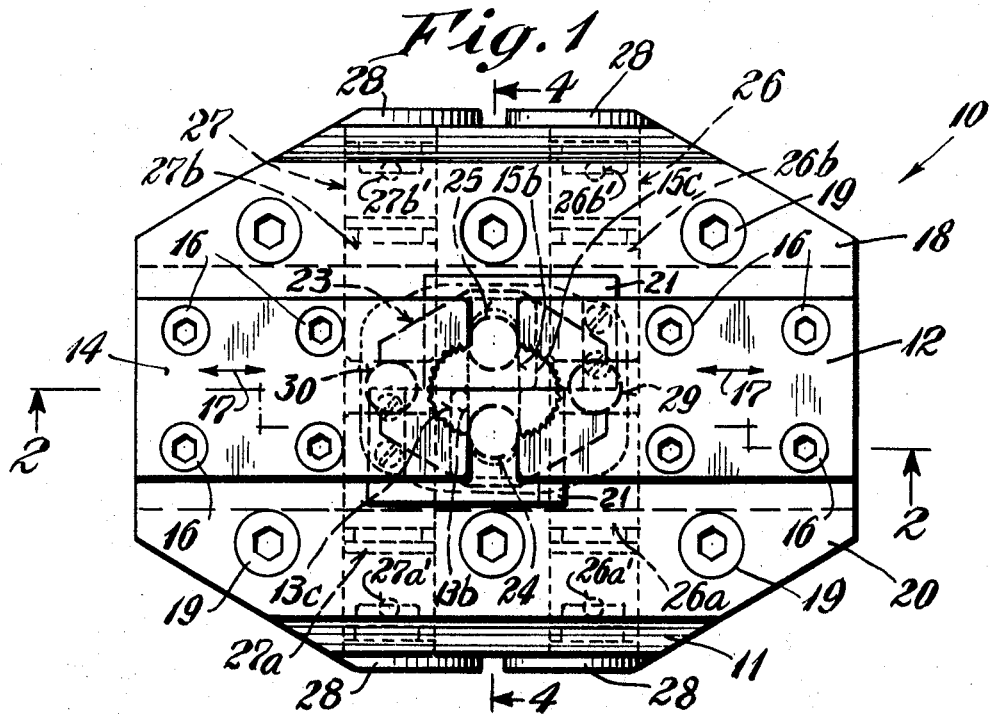
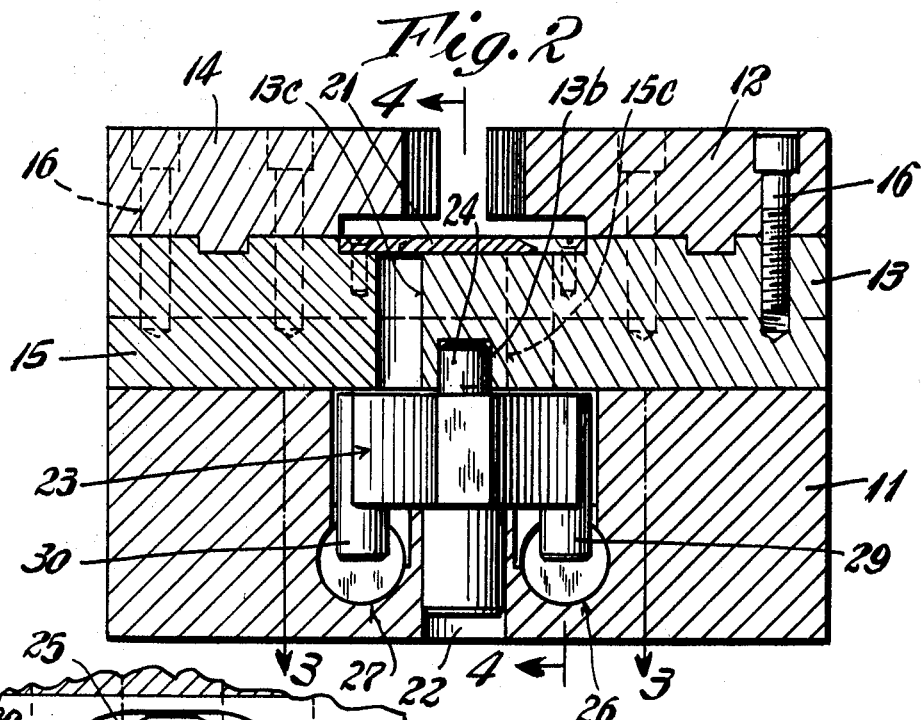
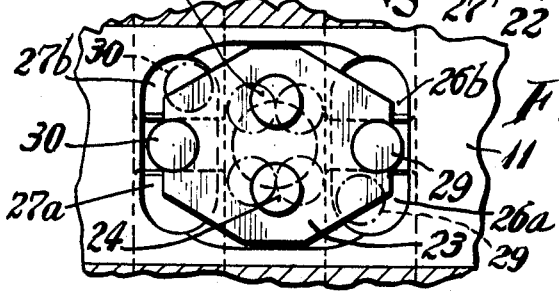

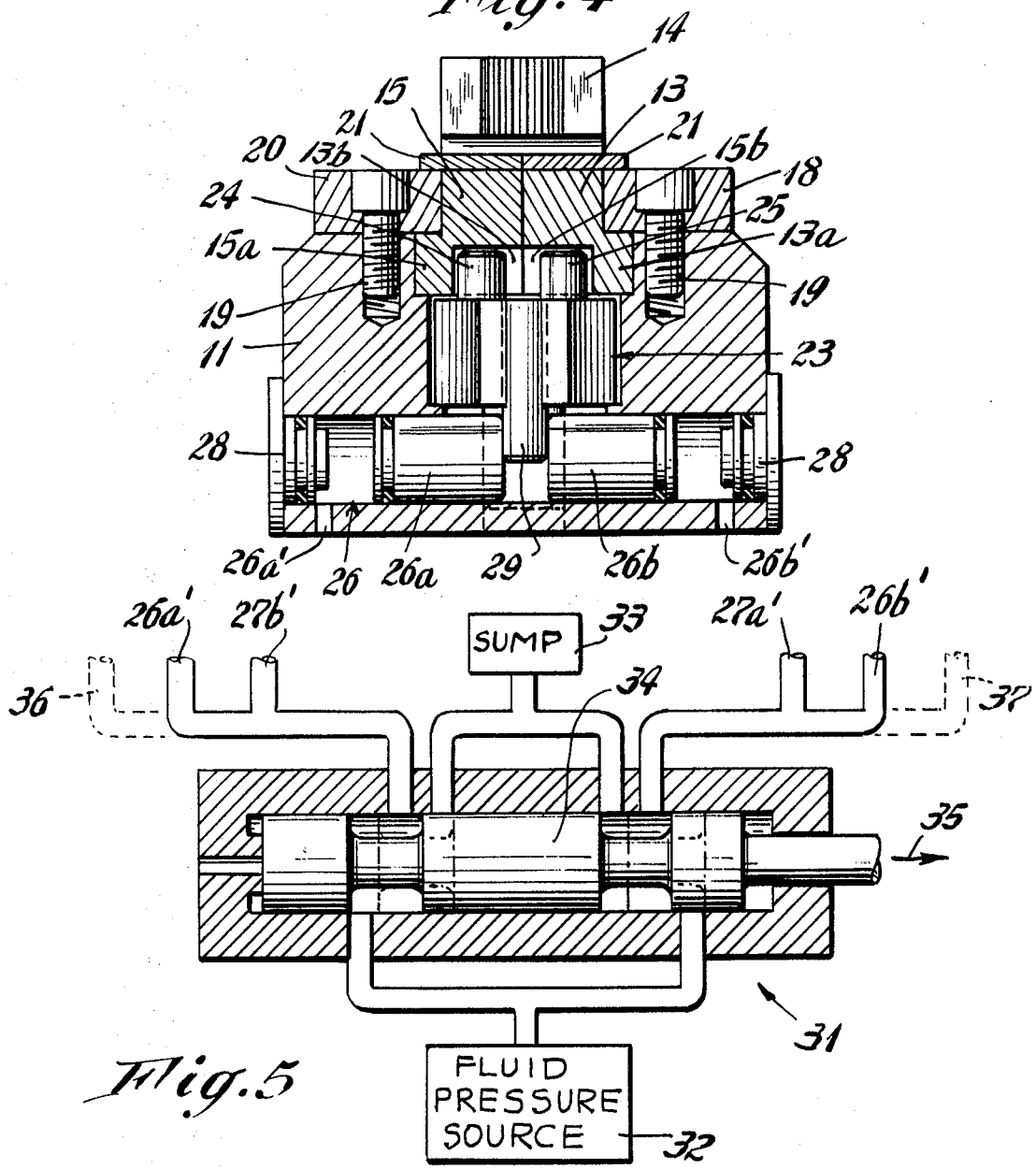

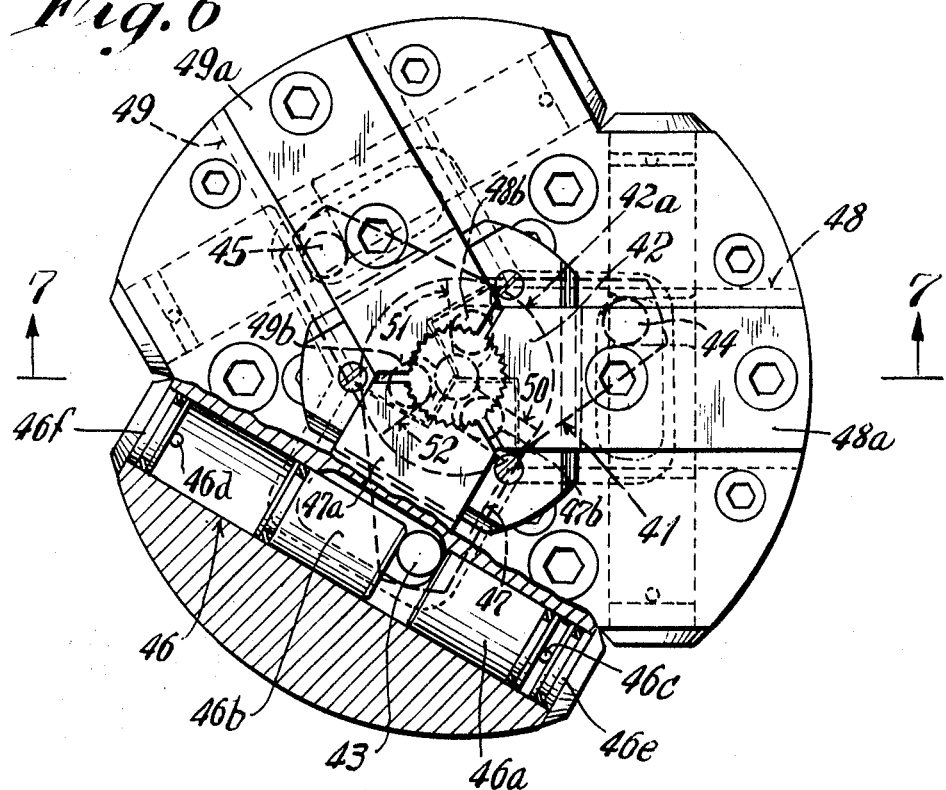
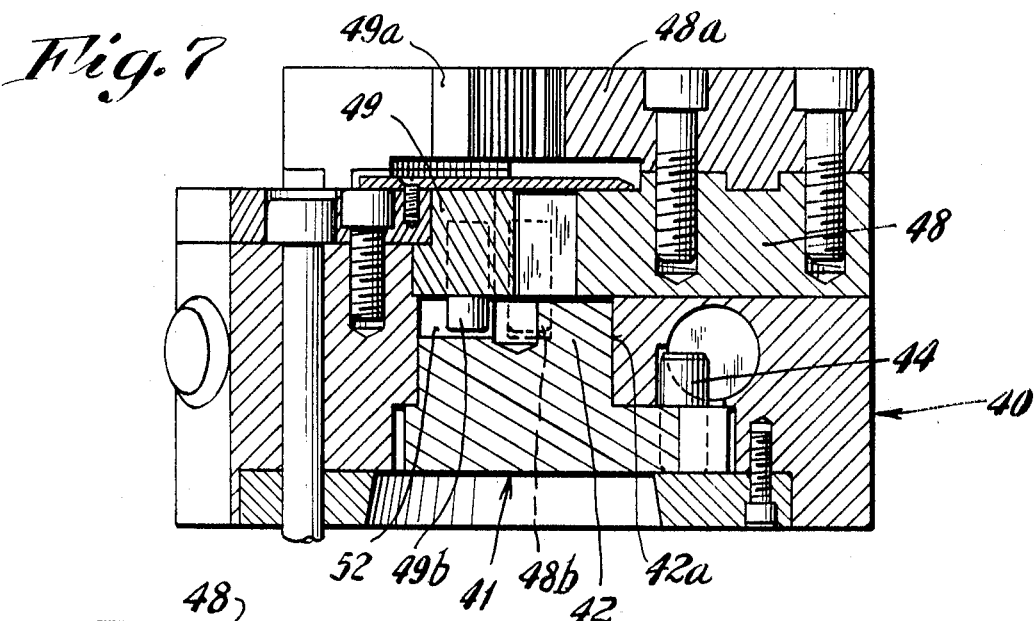

FLUID-ACTUATED CHUCK

In many operations on metal workpieces, a chuck is used to hold the workpiece with the chuck having a plurality of jaws which are movable linearly toward each other to clamp the workpiece or away from each other to release the workpiece. The most conventional type of chuck effects jaw movement by an operator manually using a tool and this has been found to be relatively expensive laborwise and in addition renders the chuck nonsusceptible to automatic operation. Though fluid-actuated chucks have heretofore been proposed to overcome these disadvantages, they have not found extremely wide commercial acceptance. One difficulty that has been encountered relates to the inability of these heretofore proposed chucks to accommodate different sizes of workpieces by having a relatively large jaw movement while still having the jaws move identically to maintain the workpiece centered on the chuck. Moreover, such proposed chucks have been quite large, composed of many parts and had a somewhat complex design.

It is accordingly an object of the present invention to provide a fluid-actuated chuck which will maintain centering of the workpiece by equally moving the jaws while also providing for a relatively large jaw movement to enable holding of different sizes of workpieces.

Another object of the present invention is to provide a fluid-actuated chuck that is extremely simple in design, relatively economical to manufacture and durable and reliable in use.

A further object of the present invention is to achieve the above objects with a fluid-actuated chuck that has few moving parts and is quite short as compared to presently existing fluid-actuated chucks.

In carrying out the present invention, there is provided a chuck having at least two jaws that are mounted for linear movement toward and away from each other end which are preferably shaped to grasp the workpiece therebetween. The body of the chuck supports a pivotable member which is interconnected to each jaw and translates rotary movement of the member into linear movement of the jaws. Each interconnection specifically includes a pin and an accurately formed groove with there being one of each for each jaw. In one embodiment the pins are carried by the pivotable member and a groove is formed in each jaw while in another embodiment the pins and grooves are reversed. The rotary movement of the member through the lost-motion connection will impart a linear movement to each jaw that is identical.

The pivotable member is actuated by at least one pair of pistons which are movable in a bore formed in the body. The pistons are mounted for linear movement and engage the pivotable member through a lost-motion connection which enables the piston linear movement to be translated into a rotatable movement of the member.

The pistons are movable in two directions to enable fluid pressure to open and close the jaws. Moreover, when the jaws are urged in the closing direction, the jaws may be continually urged to grasp the workpiece to exert a holding force thereon by maintaining the fluid pressure against the piston.

In one embodiment of the invention hereinafter described, the chuck comprises a pair of parallelly mounted jaws while in another embodiment there are three jaws in the chuck. In each of the embodiments, however, the pivotable member provides the sole actuation for the jaws and thus will cause each of the jaws to move precisely the same distance.

Other features and advantages will hereinafter appear.

In the drawing:

FIG. 1 is a plan of the fluid-actuated chuck of the present invention.

FIG. 2 is a vertical section taken on the line 2-2 of FIG. 1.

FIG. 3 is a sectional detail taken on the line 3-3 of FIG. 2.

FIG. 4 is a vertical section taken on the line 4-4 of FIG. 2.

FIG. 5 is a diagrammatic representation of a fluid control valve and interconnections with the chuck.

FIG. 6 is a plan, partly in section of another embodiment of the present invention in which the chuck has three jaws.

FIG. 7 is a section taken on the line 7-7 of FIG. 6.

FIG. 8 is a pictorial outline of the jaw support of this embodiment of the chuck.

Referring to the drawings, one embodiment of the chuck of the present invention is generally indicated by the reference numeral 10 and includes a body 11 that has a first jaw 12 mounted on a jaw support 13 and a second jaw 14 mounted on a jaw support 15. Screws 16 serve to removably secure the jaws to the jaw supports to enable replacement of the jaws on the supports though, if desired, the pieces may be made integral. The two jaws and jaw supports are identical in shape though mounted oppositely to each other.

The jaw supports 13 and 15 are mounted for linear movement in the directions indicated by arrows 17 to permit opening for insertion of a workpiece and closing for grasping of a workpiece. The jaw support 13 is formed with tongues 13a on opposite sides thereof while the jaw support 15 similarly has tongues 15a with the tongues riding in grooves formed by the body and by bars 18 and 20 secured to the body as by screws 19. The tongues and grooves serve to retain the supports and limit their movement solely to a linear movement. To protect the sliding surfaces of the supports from chips, a chip-deflecting plate 21 is secured onto each jaw support 15.

The body of the chuck has a central aperture 22 which supports, for pivotal movement, a pivotable member 23. A pair of pins 24 and 25 are secured on the member to extend upwardly therefrom and to extend into slots 13b and 15b, respectively, formed in the jaw supports 13 and 15. More specifically, as shown in FIG. 1, the jaw supports are each formed with integral extensions 13c and 15c which overlap each other and which have the slots formed therein to extend inwardly from the outer edges of the extensions perpendicular to the direction of movement of the supports. It will thus be understood that rotary movement of the member 23 will cause the jaw supports 13 and 15 to linearly move in opposite directions as the pins 24 and 25 are on opposite sides of the center of rotation or axis of the member 23. Moreover, the slots are accurately formed and the pins are precisely spaced the same distance from the axis so that the jaws will move identically and precisely with respect to the axis, thereby providing for accuracy in centering a workpiece on the axis.

The pivotable member 23 is actuated according to the present invention by a pair of cross bores 26 and 27 being formed in the body adjacent the aperture 22 with each open end of the bores being capped as by caps 28. The bores each contain a pair of freely movable pistons 26a and 26b in the bore 26 and pistons 27a and 27b in the bore 27. Further, communicating with the closed bores adjacent their caps, are fluid passageways 26a' and 26b' for the bore 26 and similar passageways 27a' are for the bore 27. Motion of the pistons is transmitted to the pivotable member 23 by the latter having downwardly extending 29 and 30 which project a substantial distance into the bores 26 and 27, respectively.

With the above construction, it will be understood that if fluid pressure is simultaneously introduced into the passageways 27a' and 26b' and the passageways 27b' and 26a' are vented, the pistons 27a and 26b will move oppositely to each other against the pins 30 and 29, respectively, to cause the pivotable member 23 to rotate clockwise. This rotating movement will cause the chuck jaw supports 13 and 15 to move linearly toward each other to a closed position to grasp a workpiece inserted therebetween. The fluid pressure is maintained in the passageways 27a' and 26b' as long as the jaws are to grasp a workpiece to thereby maintain a substantial holding force on the workpiece positioned therebetween.

When it is desired to open the chuck to remove the workpiece, fluid pressure is introduced into the passageways 26d and 27b' and passageways 27a' and 26b' are vented to cause the pistons 26a and 27b to move oppositely effecting a counterclockwise rotation of the member 23. The pins 24 and 25 will cause, through the grooves 13b and 15b, an opening motion of the jaws.

While the parts may be dimensioned so that the position of the pivotable member shown in FIG. 1, is the closed or opened position of the jaws, preferably this shown position is the midpoint of the movement of the jaws and occurs when the center line of the pins 24 and 25 are perpendicular to the movement of the jaws in order to provide the maximum extent of jaw movement. Theoretically, the maximum extent of the movement of each jaw could be the distance between the centers of the pins 24 and 25. However, the theoretical extremes of this movement are restricted by the pins 29 and 30 engaging the sides of the bores. Thus, as shown in FIG. 3, the actual movement with the described chuck is limited to between the two broken line positions of the pins 24 and 25. Instead of the pins 29 and 30 limiting the movement, the pistons could be so used by limiting their movement by the caps 28. The jaws are selected so that in the closed position they will encounter the workpiece prior to reaching their extreme closed position in order that the closing movement will be limited by the workpiece preventing further movement of the jaws.

Shown in FIG. 5 is one embodiment of a two position, linear valve 31 that may be used with the chucks herein described and may be operated manually or automatically. The valve permits admitting fluid pressure, such as oil, from a fluid source 32, though the valve 31 to the passageways 26a' and 27b' or to the passageways 27a' and 26b' while connecting the other of the pairs of passageways to a sump 33. The valve, in the solid line position shown, connects the passageways 26a' and 27b' to the source 32 while connecting the passageways 27a' and 26b' to the sump 33. This will effect an open position of the jaws. A linear movement of the valve stem 34 in the direction of an arrow 35 will position the stem in its dotted line position which will reverse the pressures on the pistons to effect closing of the jaws by connecting the passageways 27a' and 26b' to the fluid pressure source 31 and venting passageways 26a' and 27b'. It will be understood that as long as it is desired to maintain the jaws exerting a holding pressure on the workpiece, the valve remains in the jaw-closing position.

The above described valve is utilizable with heretofore described two-jaw chucks and if additional passageways are provided, as shown by the dotted lines 36 and 37, the valve may be utilizable on a three-jaw chuck embodiment shown in FIGS. 6 and 7.

In this embodiment of the chuck of the present invention, the body is somewhat cylindrical and is generally indicated by the reference numeral 40. It supports for rotating movement, a pivotable member 41 having a cylindrical bearing surface 42 that closely fits a surface 42a of an aperture formed in the body. Three piston-engaging pins 43, 44 and 45 are supported on integral projections of the member with the pins being equally arcuately spaced and located at the same radial distance from the axes of the member. Aligned with each of the piston engaging pins is an axial bore with the bore for the pin 43 being indicated by the reference numeral 46 and as in the previously described embodiment has a pair of pistons 46a and 46b. Further, the bore 46 has fluid passageways 46c and 46d and its ends are closed by caps 46e and 46f. The other two bores are identical in construction and are arranged to have their axes define an equilateral triangle about the center of the pivotable member. While three bores are specifically disclosed, the chuck may have only one, however, three are preferable as they provide a greater workpiece-holding force and a balance and symmetry of the forces on the chuck parts.

Mounted on the body 40 are three jaw supports 47, 48 and 49, each of which is mounted solely for linear movement radially from the center of the pivotable member. Jaws 47a, 48a and 49a are preferably removably mounted on their respective supports. As in the previous embodiment, There is a lost motion connection between the pivotable member and each jaw with the connection including a slot and a pin. However, in this embodiment, the pivotable member has slots formed therein while each jaw carries a pin. Each of the jaw supports is identical and referring, for example, to the outline of the jaw support 48 shown in FIG. 8, it has a downwardly extending pin 48b secured in a shaped extension of the support. The extension permits nesting of the supports when the jaws are in their closed position as they essentially are in FIG. 6.

The pivotable member 42 has grooves 50, 51 and 52 (FIG. 6) which receive the pins 47b 48b and 49b, respectively. The slots are equally arcuately disposed about the member with a common side of each being radially aligned with the axis of the member.

The position of the jaws shown in this embodiment of the chuck is about their maximum closed position and is achieved by introducing fluid from the source into the passageway 46d and into similar passageways on the other two bores associated with the pins 44 and 45 to effect counterclockwise rotation of the member 42. Upon reversal of the valve 32 to connect the passageway 46d to the sump and the passageway 46c to the fluid pressure source 31, the piston 46a will move upward and leftwardly, rotating the pivotable member 42 clockwise to cause the jaws to move radially outwardly to their open position. It will be seen that even with this construction that a substantial movement of the jaws is achieved by the use of a pivotable member and that though each of the jaws is movable independently, the movement of each is identical by reason of the jaw supports being the same and being identically connected to a single movable member.

The chucks herein described may be of the stationary type in that they do not rotate or, if desired, they may be mounted on a rotating part such as a spindle through the use of a fluid distributor. Preferably, a liquid such as oil is used as the fluid to provide pressure though, if desired, compressed gas may be also utilized. Though the jaw movement is relatively large so that it can be used on different size workpieces when the workpiece has a size that is greater than the chuck can hold, a set of jaws having a different size may be easily substituted on the jaw supports.

As used herein, the jaw support may be part of the jaw or work-grasping member and thus the word jaw may include structure that has been specifically described as a jaw support.

It will, accordingly, be understood that there has been disclosed a chuck which not only is fluid actuated to effect opening and closing its jaws but also enables relatively large jaw movement to accommodate different size workpieces. Even with the large jaw movement, each of the jaws is moved accurately, precisely and identically by the use of a connection to each from a single pivotable movement so that a common extent of movement is made to each. For providing the movement, which may be a manual or automatic operation of a fluid valve, the chuck includes pistons which engage the pivotable member to effect its rotational movement and to maintain a closing force on the workpiece until the valve is operated to move the jaws to a workpiece-releasing position. The connections between the jaws and the pivotable member and the pistons are of the lost-motion type which permit translation of rotary to linear movement in the first instance and linear to rotary movement in the latter instance.

Variations and modifications may be made within the scope of the invention and portions of the improvements may be used without others.

What I claim is:

1. A fluid-actuated chuck comprising a body having a central axis, at least two coplanar jaws, means mounting the jaws for only linear movement toward and away from the central axis, a cylindrical aperture formed in the body on the central axis, a pivotable member having a cylindrical portion positioned within the aperture for enabling rotational movement about the axis, a first lost-motion means interconnecting the jaws to the member for translating rotary to linear movement and including only a pin and a slot for each jaw, fluid-actuating means including a bore formed in the base and piston means movable in said bore with there being a bore and a piston means for each jaw, second lost-motion means interconnecting each piston means to the pivotable member and including only a pin and a channel, said pins of the first lost-motion means extending beyond the member oppositely from the pins of the second lost-motion means and being positioned nearer the central axis and in which the pins of the first lost-motion means are angularly displaced from the pins of the second lost-motion means about the member.

2. The invention as defined in claim 1 in which each piston means includes two separate pistons and in which the pins of the second lost-motion means are secured on the member and extend into the channel formed by the adjacent two ends of the pistons.